(12) United States Patent
Chu

(10) Patent No.: US 10,818,308 B1
(45) Date of Patent: Oct. 27, 2020

(54) SPEECH CHARACTERISTIC RECOGNITION AND CONVERSION

(71) Applicant: Snap Inc., Santa Monica, CA (US)

(72) Inventor: Wei Chu, Culver City, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/965,378

(22) Filed: Apr. 27, 2018

Related U.S. Application Data

(60) Provisional application No. 62/491,947, filed on Apr. 28, 2017.

(51) Int. Cl.
| | |
|---|---|
| *G10L 13/00* | (2006.01) |
| *G10L 21/013* | (2013.01) |
| *G10L 15/26* | (2006.01) |
| *G10L 13/033* | (2013.01) |
| *G10H 1/06* | (2006.01) |
| *G10L 13/04* | (2013.01) |
| *G10L 15/02* | (2006.01) |

(52) U.S. Cl.
CPC .............. *G10L 21/013* (2013.01); *G10H 1/06* (2013.01); *G10L 13/0335* (2013.01); *G10L 13/043* (2013.01); *G10L 15/265* (2013.01); *G10H 2250/455* (2013.01); *G10L 2015/027* (2013.01)

(58) Field of Classification Search
CPC ...... G10L 13/00; G10L 13/033; G10L 13/043
See application file for complete search history.

(56) References Cited

U.S. PATENT DOCUMENTS

| | | | | |
|---|---|---|---|---|
| 5,799,276 | A * | 8/1998 | Komissarchik | ......... G10L 15/04 704/207 |
| 6,836,761 | B1 * | 12/2004 | Kawashima | .......... G10L 13/033 704/258 |
| 8,311,831 | B2 * | 11/2012 | Kato | ...................... G10L 21/02 381/62 |
| 8,898,062 | B2 * | 11/2014 | Kato | ..................... G10L 13/033 704/266 |
| 2003/0078780 | A1 * | 4/2003 | Kochanski | .............. G10L 13/10 704/258 |
| 2003/0154847 | A1 * | 8/2003 | Akazawa | ................. G10H 7/02 84/627 |
| 2005/0049875 | A1 * | 3/2005 | Kawashima | .......... G10L 13/033 704/266 |
| 2006/0015815 | A1 * | 1/2006 | Okamoto | ............. G10H 1/0008 715/736 |
| 2006/0156906 | A1 * | 7/2006 | Haeker | ................ G10H 1/0008 84/609 |
| 2010/0070283 | A1 * | 3/2010 | Kato | ...................... G10L 21/02 704/278 |

(Continued)

*Primary Examiner* — Michael N Opsasnick
(74) *Attorney, Agent, or Firm* — Schwegman Lundberg & Woessner, P.A.

(57) ABSTRACT

Systems, devices, media, and methods are presented for converting sounds in an audio stream. The systems and methods receive an audio conversion request initiating conversion of one or more sound characteristics of an audio stream from a first state to a second state. The systems and methods access an audio conversion model associated with an audio signature for the second state. The audio stream is converted based on the audio conversion model and an audio construct is compiled from the converted audio stream and a base audio segment. The compiled audio construct is presented at a client device.

20 Claims, 13 Drawing Sheets

(56) References Cited

U.S. PATENT DOCUMENTS

| | | | | |
|---|---|---|---|---|
| 2012/0014673 A1* | 1/2012 | O'Dwyer | ............ | G06F 3/0346 386/282 |
| 2013/0077447 A1* | 3/2013 | Hiratsuka | ............ | G10H 1/0066 367/199 |
| 2013/0339035 A1* | 12/2013 | Chordia | ............ | G10L 19/00 704/500 |
| 2014/0074459 A1* | 3/2014 | Chordia | ............ | G10L 19/00 704/203 |

* cited by examiner

US 10,818,308 B1

SPEECH CHARACTERISTIC RECOGNITION AND CONVERSION

CLAIM FOR PRIORITY

This application claims the benefit of priority of U.S. Provisional Application 62/491,947, filed Apr. 28, 2017, which is hereby incorporated by reference in its entirety.

TECHNICAL FIELD

Embodiments of the present disclosure relate generally to conversion of sound data from one form to another. More particularly, but not by way of limitation, embodiments of the present disclosure are directed to machine-learned conversion of speech to singing.

BACKGROUND

In recent years, mobile devices, wearable devices, smart devices, and the like have pervaded nearly every aspect of modern life. Although previous systems perform operations to modify aspects of audio data, such systems and methods fail to provide the functionality and performance described herein, and fail to adequately address the technical solutions described herein.

BRIEF DESCRIPTION OF THE DRAWINGS

Various ones of the appended drawings merely illustrate example embodiments of the present disclosure and should not be considered as limiting its scope.

Figure 1:
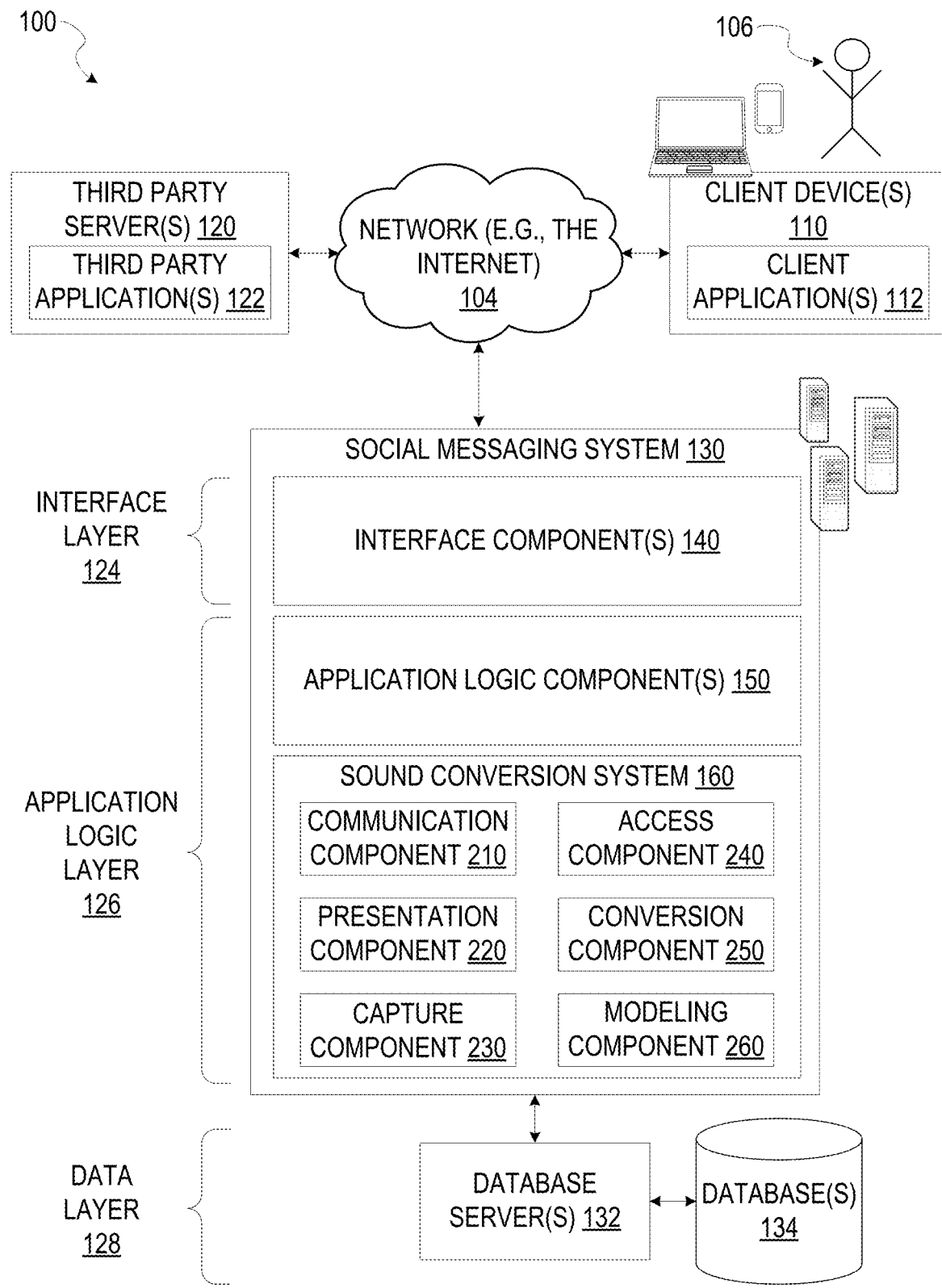
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Conventional sound conversion systems, such as voice conversion systems often rely a database of singing notes from a professional singer. Systems, methods, and concepts described herein may employ a single sound template (e.g., singing template) for each background for which sound is to be converted. Conventional reliance on a singer may be precluded by the methods and systems described herein by incorporating or employing annotated versions of background sounds. For example, the present systems and methods may use music scores of an accompaniment for which spoken words are being converted. Further, though conventional systems often attempted to match or replace converted sounds, systems and methods of the present disclosure may perform sound conversion while maintaining at least a portion of a unique character or identifying aspects of the sound being converted. For example, conventional systems generating song-like information may produce products which are variants of the voice of a professional singer, used as a baseline for the conversion. Embodiments of the presently described systems and methods convert sounds (e.g., spoken words) while maintaining sound signatures or identifying characteristics (e.g., vocal identity) of the sound (e.g., spoken words) being converted. As described, the present systems and methods may enable or ensure a technical benefit of maintaining sound signatures or vocal identity of speakers in the generated singing voices in this method.

In various embodiments, a sound conversion system is described. The sound conversion system may identify patterns within sounds and generate data models from the sounds and identified patterns. The sound conversion system may then use the data models of the sounds to convert subsequently received or identified sounds from a first form to a second form. The sound conversion system may then further modify or combine the second form of subsequently identified sounds in a manner desired by a user.

An example embodiment of the sound conversion system is a vocal conversion system. The vocal conversion system may convert spoken words, received from a microphone or a sound file, into singing. The vocal conversion system may perform a series of operations to generate a song, combining converted singing and accompaniment.

In some example embodiments, the vocal conversion system performs a staged process for converting a speech or spoken vocal signal to singing. In some instances, the staged process is performed in three stages, with each stage comprising one or more operations. In a first stage, according to some example embodiments, the vocal conversion system infers a pitch contour for a given set of notes, such as a song, a portion of a song, or an accompaniment. The first stage may comprise accessing, receiving, or capturing an audible progression of notes. The audible progression of notes may be accessed, or captured as a singer singing with accompanying music. The audible progression of notes may also comprise a singer without accompaniment, one or more accompanying instruments without a set of associated and sung lyrics, combinations thereof, or any other suitable audio representing at least a portion of a defined series of notes, such as a song.

In some embodiments, the vocal conversion system initially infers a pitch contour from data representing the progression of notes. For example, the vocal conversion system may infer the pitch contour for a progression of notes (e.g., a song) based on a static, printed version of the progression of notes, such as sheet music or a file comprising a processor-readable encoding of the sheet music or the progression of notes. By way of further example, the vocal conversion system may incorporate a sung portion of a song, an accompaniment portion of a song, a portion of a song comprising a sung portion and an accompaniment portion, and a representation of a progression of notes (e.g., lyrics, accompaniment, and other parts of a song written in musical notation). Upon inference of the pitch contour, the vocal conversion system may generate a template or model from the pitch contour. In some instances, the pitch contour may be estimated as a template or portion of a model (e.g., input for a machine-learned model).

In a second stage, the vocal conversion system converts a portion of spoken word or utterance to a sung form. The vocal conversion system may capture the portion of spoken words or utterances (e.g., spoken lyrics) by a microphone coupled to a computing device, access the portion of spoken words as an audio file, or retrieve and access the portion of spoken words in a file (e.g., an audio file or a video). The audio file may be stored locally on a computing device or stored and retrieved from a remote location or computing device, such as a server or network-based computing device. The vocal conversion system may convert the portion of spoken word according to one or more of the accompaniment music (e.g., the encoded or music notation of the accompaniment), the audible progression of notes (e.g., sung lyrics, audible accompaniment music, or a song comprising sung lyrics and audible accompaniment), the template generated in the first stage, or the model generated in the first stage. In various example embodiments, using the accompaniment music (e.g., written or audible), the sung lyrics, the model or the template, the portion of spoken word or utterance may be converted according to the pitch contour.

In a third stage, the vocal conversion system combines (e.g., mixes) the converted singing voice and an audible instance of accompaniment music to form a song. In some embodiments, the audible instance of accompaniment music is an audibly performed or recorded version of the musically annotated accompaniment music or at least a portion of the audible accompaniment music described above and used to generate the template or model.

In some embodiments, the systems and methods of the present disclosure generate a multi-stage pipeline for converting speaking voices to singing voices (e.g., speech-to-singing synthesis). The conversion may be performed according to accompaniment music. Although described above with respect to three stages, it should be understood that the sound conversion system may employ any suitable number of operations to perform the functionality and technical benefits described herein.

FIG. 1 is a network diagram depicting a network system 100 having a client-server architecture configured for exchanging data over a network, according to one embodiment. For example, the network system 100 may be a messaging system where clients may communicate, exchange, and convert data within the network system 100. The data may pertain to various functions (e.g., sending and receiving text, audio, and media communication, determining geolocation, etc.) and aspects (e.g., publication of converted audio, publication of comparative converted and unconverted audio data, etc.) associated with the network system 100 and its users. Although illustrated herein as client-server architecture, other embodiments may include other network architectures, such as peer-to-peer or distributed network environments.

As shown in FIG. 1, the network system 100 may include a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component (s) (e.g., a web server) 140, which receives requests from various client-computing devices and servers, such as client device(s) 110 executing client application(s) 112, and third party server(s) 120 executing third party application(s) 122. In response to received requests, the interface component (s) 140 communicates appropriate responses to requesting devices via a network 104. For example, the interface component (s) 140 can receive requests such as Hypertext Transfer Protocol (HTTP) requests, or other web-based, Application Programming Interface (API) requests.

The client device(s) 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client device(s) 110 are executing the client application(s) 112. The client application(s) 112 can provide functionality to present information to a user 106 and communicate via the network 104 to exchange information with the social messaging system 130. Each of the client device(s) 110 can comprise a computing device that includes at least a display and communication capabilities with the network 104 to access the social messaging system 130. The client device(s)

110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more user(s) 106 can be a person, a machine, or other means of interacting with the client device(s) 110. In some embodiments, the user(s) 106 interact with the social messaging system 130 via the client device(s) 110. The user(s) 106 may not be part of the networked environment, but may be associated with the client device(s) 110.

As shown in FIG. 1, the data layer 128 has one or more database server(s) 132 that facilitate access to one or more information storage repositories or database(s) 134. The database(s) 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic component (s) 150, which, in conjunction with the interface component (s) 140, generate various user interfaces with data retrieved from various data sources or data services in the data layer 128. Individual application logic component (s) 150 may be used to implement the functionality associated with various applications, services, and features of the social messaging system 130. For instance, a social messaging application can be implemented with one or more of the application logic component (s) 150. The social messaging application provides a messaging mechanism for users of the client device(s) 110 to send and receive messages that include text and media content such as pictures and video. The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application server component (s) 150.

Figure 2:
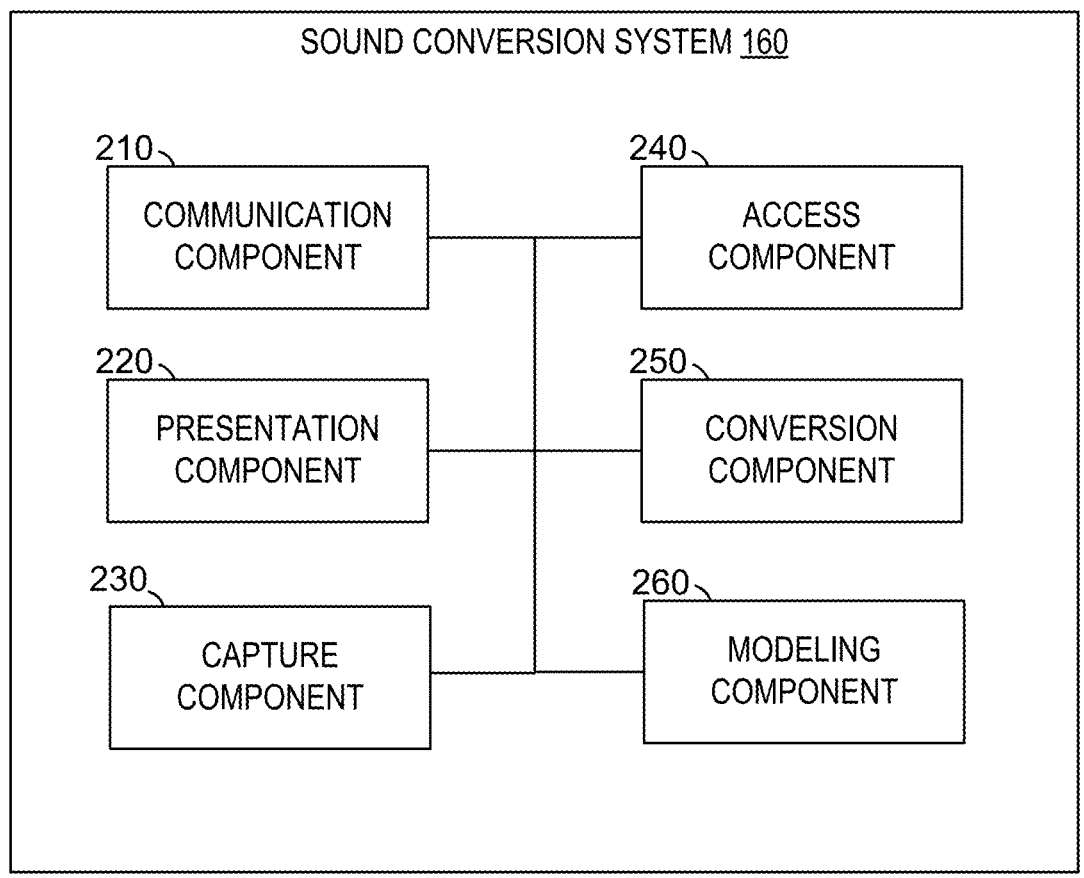
FIG. 2 is a diagram illustrating a sound conversion system, according to some example embodiments.

In FIG. 2, in various embodiments, the sound conversion system 160 can be implemented as a standalone system or implemented in conjunction with the client device 110, and is not necessarily included in the social messaging system 130. The sound conversion system 160 is shown to include a communication component 210, a presentation component 220, a capture component 230, an access component 240, a conversion component 250, and a modeling component 260. All, or some, of the components 210-260, communicate with each other, for example, via a network coupling, shared memory, and the like. Each component of components 210-260 can be implemented as a single component, combined into other components, or further subdivided into multiple components. Other components not pertinent to example embodiments can also be included, but are not shown.

The communication component 210 provides various communications functionality. For example, the communication component 210 receives configuration data for identification, retrieval, and transmission of audio or textual information (e.g., a musical score), such as pictograph data (e.g., an image file), audio data, access requests, transmission requests or responses, and geographic indications (e.g., a particular latitude and longitude). The communication component 210 exchanges network communications with the database server(s) 132, the client device(s) 110, and the third-party server(s) 120. The information retrieved by the communication component 210 may include data associated with the user (e.g., member profile data from an online account or social network service data) or other data to facilitate the functionality described herein.

The presentation component 220 provides various presentation and user interface functionality operable to interactively present and receive information to and from the user. For instance, the presentation component 220 can cause presentation of one or more audio data, representations of audio data, textual data (e.g., musical scores, text descriptions, etc.), images, or pictographs on a user interface or in a display of a user device (e.g., include the one or more pictographs in a virtual keyboard user interface of the user device). In various embodiments, the presentation component 220 presents or causes presentation of information (e.g., visually displaying information on a screen, acoustic output, haptic feedback). Interactively presenting information is intended to include the exchange of information between a particular device and the user. The user may provide input to interact with the user interface in many possible manners, such as alphanumeric, point based (e.g., cursor), tactile, or other input (e.g., touch screen, tactile sensor, light sensor, infrared sensor, biometric sensor, microphone, gyroscope, accelerometer, or other sensors), and the like. The presentation component 220 provides many other user interfaces to facilitate functionality described herein. The term "presenting" as used herein is intended to include communicating information or instructions to a particular device that is operable to perform presentation based on the communicated information or instructions.

The capture component 230 may capture one or more types of media. For example, the capture component 230 may capture audio data defining an audio stream (e.g., speech, singing, etc.), a base audio segment (e.g., an accompaniment score), or any other suitable audio data. In some embodiments, the capture component 230 captures image data representing musical compositions such as sheet music, scores, video streams, or any other visual representation of a musical composition.

The access component 240 accesses audio conversion models, musical scores, audio segments, user interface selections, and other suitable data. In some embodiments, the access component 240 performs operations relating to data retrieval prompted by one or more other components of the sound conversion system 160. The access component 240 may access audio conversion models associated with the modeling component; access base audio segments and audio streams or recordings and pass the segments, streams, or recordings as input to the audio conversion model; and access or retrieve data responsive to user interface interactions corresponding to user interface elements presented by the presentation component 220.

The conversion component 250 converts audio streams to generate an audio construct. The conversion component 250 may convert audio streams based on audio conversion models of the modeling component 260. In some embodiments, the conversion component 250 performs energy analysis operations to identify acoustic syllables within the audio stream. The conversion component 250 may also perform segmenting and framing operations, described in more detail below, to define the acoustic syllables, within an audio stream, as manipulable segments within the audio stream. In some instances, the conversion component 250 manipulates one or more of the acoustic syllables, segments, or frames to change spoken audio data into sung audio data.

The modeling component 260 may initiate operations for capture and modeling of received audio streams to generate audio conversion models. In some embodiments, audio conversion models are tailored to specified pieces of music or performances thereof. In some instances, audio conversion models are tailored to styles of music, genres of music, musical artists, or other suitable groupings of musical compositions.

Figure 3:
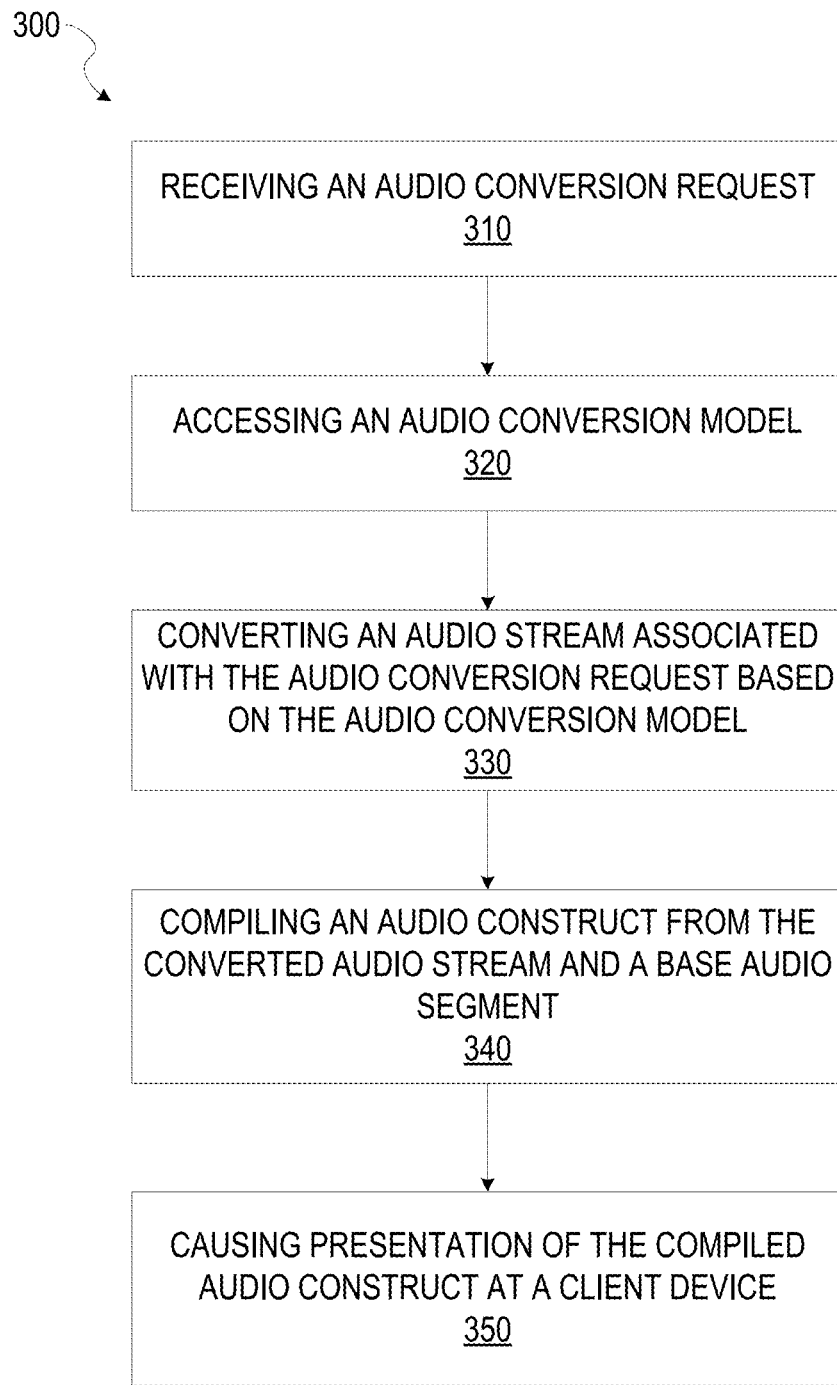
FIG. 3 is a flow diagram illustrating an example method for sound conversion, according to some example embodiments.

FIG. 3 depicts a flow diagram illustrating an example method 300 for converting audio data from one form to another, according to some example embodiments. The method 300 may be performed by components of the sound conversion system 160, shown in FIGS. 1 and 2, and are so described below for purposes of illustration.

In operation 310, the communication component 210 receives an audio conversion request. In some embodiments, the audio conversion request is a set of information indicating an intention to convert a selection of audio data (e.g., a file or a stream of captured sound) from a first state to a second state. In some instances, a portion of an audio stream (e.g., the selection of audio data), such as one or more sound characteristics, are subject to the audio conversion request. For example, an audio stream may comprise one or more sound characteristics associated with spoken text. The audio conversion request may comprise elements indicating a conversion type for the one or more sound characteristics to convert the one or more characteristics of the spoken text from a first state to a second state associated with sung lyrics.

The audio conversion request may be received by the communication component 210 of the sound conversion system 160. In some instances, one or more of the communication component 210 and the access component 240 detect one or more user interface selections of an application. The one or more user interface selections cause the communication component 210 or the access component 240 to generate the audio conversion request. In some instances, the audio conversion request causes one or more components of the sound conversion system 160 to generate and present one or more graphical user interface screens on a computing device (e.g., the client device 110, a mobile computing device, a tablet device, or a desktop computing device).

The graphical user interface screens may provide one or more selectable user interface elements, such as a menu, enabling access or capture of an audio stream and generation of the audio conversion request for conversion of the audio stream, as described below. For example, in some instances the selections in the graphical user interface may activate a microphone on a computing device to capture the audio stream for conversion. In some embodiments, capture of the audio stream may cause a component of the sound conversion system 160 to automatically generate the audio conversion request.

In operation 320, the access component 240 accesses an audio conversion model. In some embodiments, the audio conversion model is associated with an audio signature for the second state into which the selection of audio data is to be converted. For example, where the audio conversion request seeks to convert audio data from a first state of spoken text to a second state of sung lyrics, the audio conversion model may be associated with sung lyrics, a song, an accompaniment, accompaniment music for a specified song, or a pitch contour. The audio conversion model may correspond to at least a portion of the audio conversion request. In some instances, an identifier for the audio conversion model is included in the audio conversion request. In embodiments where the audio conversion model is associated with a pitch contour of a specified musical piece, the audio conversion request may correspond to the audio conversion model by including an identifier for a musical piece matching a musical piece designated for the audio conversion model.

In some embodiments, the access component 240 accesses the audio conversion model by accessing memory, a non-transitory processor-readable storage device, a data structure stored in a database, a server in a networked system, combinations thereof, or any other suitable source. In such embodiments, the audio conversion model may be a predetermined audio conversion model. The predetermined audio conversion model may be generated at a time prior to receiving the audio conversion request. The audio conversion model may be generated in a manner similar to or the same as described below.

In some instances, the access component 240 accesses the audio conversion model by communicating with the modeling component 260 and the capture component 230. The modeling component 260 may initiate one or more operations for capture, in association with the capture component 230, and modeling of a received audio stream to generate the audio conversion model. Generation of the audio conversion model is described below with respect to FIG. 4.

In operation 330, the conversion component 250 converts the audio stream associated with the audio conversion request based on the audio conversion model. In some embodiments, the conversion component 250 performs one or more operations to convert the audio stream from the first state to the second state. The operation 330 may comprise or initiate a second stage (e.g., set of operations) to complete conversion of a desired audio stream. A first stage may be understood as an audio conversion model generation stage, described below in FIG. 4.

The conversion component 250 may prepare the audio stream by generating a set of segments and a set of frames within the segments. The conversion component 250 may detect energy levels to identify boundaries between acoustic syllables. The conversion component 250 may determine a set of pitch contours of individual frames, segments, and acoustic syllables. The conversion component 250 may then modify one or more of the frames and segments to have durations comparable to segments or acoustic syllables within a musical composition. The conversion component may then adjust pitch contours of the segments and acoustic syllables within the audio stream to conform to the target template or the audio conversion model.

In operation 340, the conversion component 250 compiles an audio construct from the converted audio stream (e.g., the audio stream converted in operation 330) and a base audio segment. The base audio segment may be understood as an accompaniment score. The accompaniment score (e.g., an accompaniment performed without vocal elements of the musical composition) may comprise one or more of a beat, a time signature, and a tempo. The conversion component 250 may compile the audio construct by combining the converted audio stream of operation 330 with the accompaniment score. The converted audio stream may be combined with the accompaniment score, such that the converted audio stream is aligned with the accompaniment score based on the beat, time signature, and tempo of the accompaniment score. In some embodiments, the conversion component 250 performing sub-operations of the operation 340 act as a third stage (e.g., set of operations) of the audio conversion process described above.

In operation 350, the presentation component 220 causes presentation of the compiled audio construct. The presentation component 220 may play the compiled audio construct through audio output devices (e.g., speakers) based on completion of operation 340. In some embodiments, the presentation component 220 causes presentation of the compiled audio construct within a user interface depicted on the client device and via one or more speakers. In some embodiments, the compiled audio construct is incorporated into a video presentation such that a voice of a user is converted by the sound conversion system 160 into a sung musical composition and the compiled audio construct is aligned and played in a manner corresponding to visual components within the video presentation.

Figure 4:
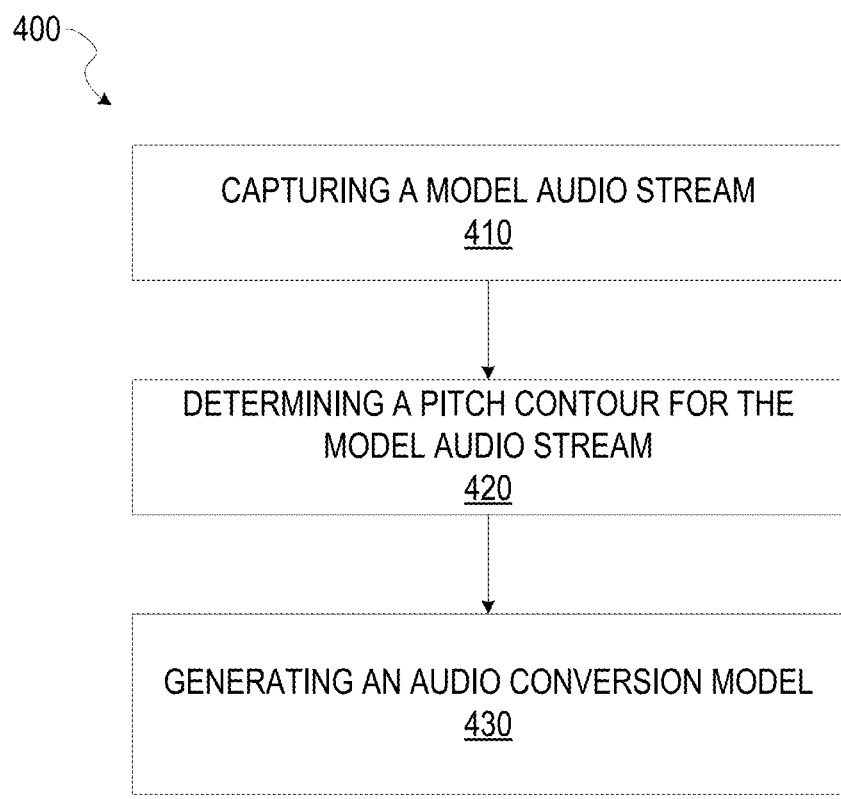
FIG. 4 is a flow diagram illustrating an example method for generating an audio conversion model, according to some example embodiments.

FIG. 4 depicts a flow diagram illustrating an example method 400 for generating an audio conversion model. The operations of method 400 may be performed by components of the sound conversion system 160. In some instances, certain operations of the method 400 may be performed using one or more operations of the method 300 or as sub-operations of one or more operations of the method 300.

In operation 410, the capture component 230 captures a model audio stream (e.g., a defined audio stream) to be modeled. The model audio stream may be understood as a performance of a musical composition, a vocal performance and accompaniment, a vocal performance without accompaniment, or any other suitable example audio stream representative of a musical composition. For example, the model audio stream or the defined audio stream may be a performed (e.g., sung or played) musical score. The capture component 166 may receive, via a microphone or a microphone corresponding to a video capture component, a sung musical score, a performed accompaniment score, a sung musical score aligned with a performed accompaniment score, combinations thereof, or any other suitable defined audio stream. Where the defined audio is a musical score, the defined audio stream may define a melody pitch contour. In some instances, the melody pitch contour may be flat within each musical note. When sung, the pitch contour of the singer may contain fluctuations which can be observed as an indicator of the naturalness of a singing voice. Such observable natural fluctuations may be understood as a sound or vocal signature The capture component 230 may pass the model audio stream to the modeling component 260. In some embodiments, the capture component 230 passes the model audio stream to the modeling component 260 as the model audio stream is being captured. The capture component 230 may also pass the model audio stream to the modeling component 260 after completion of the model audio stream.

In operation 420, the modeling component 260 obtains, isolates, selects, or otherwise determines a pitch contour for the model audio stream. The pitch contour may be understood as values corresponding to a progression of notes within a musical composition. The pitch contour may be a progression of flat pitches or a progression of variable pitches. For example, the pitch contour may be close to or proximate to a real or natural singing pitch contour.

In some embodiments, the modeling component 260 obtains or isolates the pitch contour from one or more portions of audio data (e.g., singing or musical accompaniment) of the model audio stream. In such instances, the modeling component 260 obtains the pitch contour from the model audio stream as a set of pitches and fluctuations of a single voice, a musical accompaniment, a sung or performed musical score, combinations thereof, or any other suitable data. In some instances, the modeling component 260 obtains or selects the pitch contour from a musical score, such as a written or image-based musical score (e.g., an image of a musical score), data representing a musical score, combinations thereof, or any other suitable non-audio data.

In some embodiments, the model component 260 generates a target template, at least in part, from the pitch contour. The target template may be a representation of audio data within the model audio stream to which a subsequent audio stream may be matched. For example, the pitch contour may be obtained from the model audio stream, such that the pitch contour is the target template. The target template may also be generated from voice data alone, accompaniment data alone, or a written musical score. In such instances, the target template represents at least a portion of the model audio stream (e.g., voice pitch matched with beats, tempo, and duration). In some embodiments, the target template may be used to generate the audio conversion model. The target template may be processed by the modeling component 260 to incorporate additional components, audio streams, classifiers, processes, or operations. In some instances, the target template serves as all or a portion of the audio conversion model. The target template may be used in shifting or otherwise converting one or more pitch of the selection of audio data from pitches associated with speech to pitches associated with song or sung lyrics.

In operation 430, the modeling component 260 generates the audio conversion model. The audio conversion model may be generated from the model audio stream associated with a musical composition (e.g., a performance of a professional singer and accompaniment). In such instances, the singer may perform sung lyrics while listening to an accompaniment musical score played through headphones. The model audio stream may be captured as a sung vocal track and may be recorded without the accompanying music score. The pitch contour retrieved from the model audio stream of the professional singer may be generated and a beat structure or note structure may be determined. The pitch contour may then be aligned with the beat structure or note structure to form the audio conversion model.

In some embodiments, the modeling component 260 generates the audio conversion modeling with a pitch tracking algorithm. The pitch tracking algorithm may be run on the singing voice of the model audio stream to obtain the singing pitch contour. The singing pitch contour may not be continuous, as the singer is not vocalizing all the time. The modeling component 260 may merge two adjacent segments of singing pitch contours. In merging the adjacent segments, the modeling component 260 may generate a longer segment if the gap between two segments in time is less than a preset threshold. This merging may be continuously performed until no more segments can be merged. After the merging, the modeling component 260 may employ a set of operations acting as an interpolation algorithm. The modeling component 260 may perform the interpolation algorithm on the pitch contour to obtain the pitch value for frames which do not have pitch values. In such cases, the frames may be a division of the model audio stream within each merged segment. The modeling component 260 may then generate the merged adjacent segments of the pitch contours to obtain a singing pitch contour. The merged segments of the singing pitch contour may be reusable for different spoken voices to be converted, discussed in example embodiments below.

In some embodiments, the modeling component 260 obtains the pitch contours without using a professional studio to record the singing voice. In some instances, the modeling component 260 may use the pitch information from the singer, without relying on other information and without relying on isolated audio, of the type made in studio recorded tracks. For example, the modeling component 260 may filter or remove portions of the defined audio stream that are irrelevant, such as noise, enabling use of any suitable recording or audio capture device such as a microphone on a smartphone.

Where the pitch contour is generated from a musical score, the modeling component 260 may generate the audio conversion model by aligning the pitch contour (e.g., a set of individual pitches within the model audio stream) with beats or other accompanying music. The music scores may define a melody represented by the pitch contour. The pitch contour from the musical score may be flat, without the natural variation in pitch from a voice. In such instances, the modeling component 260 may estimate or incorporate overshoot, vibrato, preparation, and fluctuations into a melody represented by the pitch contour or into individual pitch elements, frames, or instances within the pitch contour. In some embodiments, the modeling component 260 may incorporate estimations from Saito et al. Parameters may be estimated by the methodology of Saito et al. to generate a synthesized pitch contour, generating using a fluctuation model, aligned with one or more of a beat structure or note structure of the musical score.

A singing pitch contour obtained using the methods, operations, and algorithms of the modeling component 260, described herein, retains the naturalness of the singing. A tracked pitch may deviate from a ground truth pitch. Such deviation may be caused either by disturbing background noise captured in a non-completely quiet studio. In some embodiments, the modeling component 260 uses a noise robust pitch tracking algorithm to eliminate or reduce effects of ambient noise. In some instances, such a noise robust pitch tracking algorithm may incorporate one or more noise threshold operations to ensure the defined audio stream includes suitable audio information. In some embodiments, the defined audio stream may be captured by professional composers or other performers in a controlled environment to manually correct the pitch.

Figure 5:
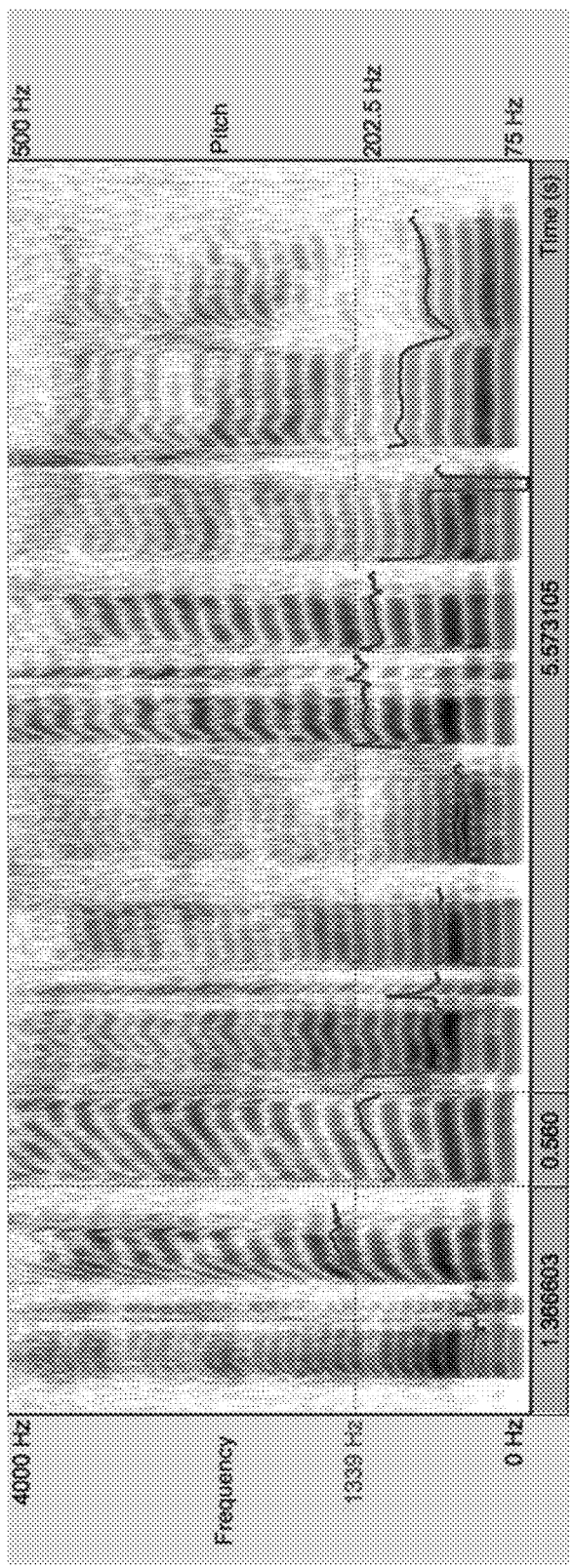
FIG. 5 is a graphical representation of aspects of an audio stream, according to some example embodiments.

The flexibility offered by the modeling component 260 may enable generation of the audio conversion model in non-ideal settings or using non-ideal defined audio streams. Shown in FIG. 5 is a pattern of a real singing pitch contour (e.g., gray/black striations), which does not wholly align a generated synthetic pitch contour (e.g., line segments defined with respect to the 1339 Hz dashed line). As shown in FIG. 5, the synthetic pitch contour may be generated using Saito's model or methods. In FIG. 5, from 1.36 second to 1.92 seconds, the pitch of the singer is rising in a quasi-linear manner, while in Saito's model, the pitch contour should be quasi-flat in the middle of this segment.

The modeling component 260 may select from a music score-based model, a singing voice-based model, a hybrid model, or any other suitable modeling technique based on one or more selections within a user interface provided by the sound conversion system 160. In some embodiments, the sound conversion system 160 may select between the modeling techniques based on an input type, such as input of the defined audio stream, characteristics of the defined audio stream, or textual representation of a musical score.

Figure 6:
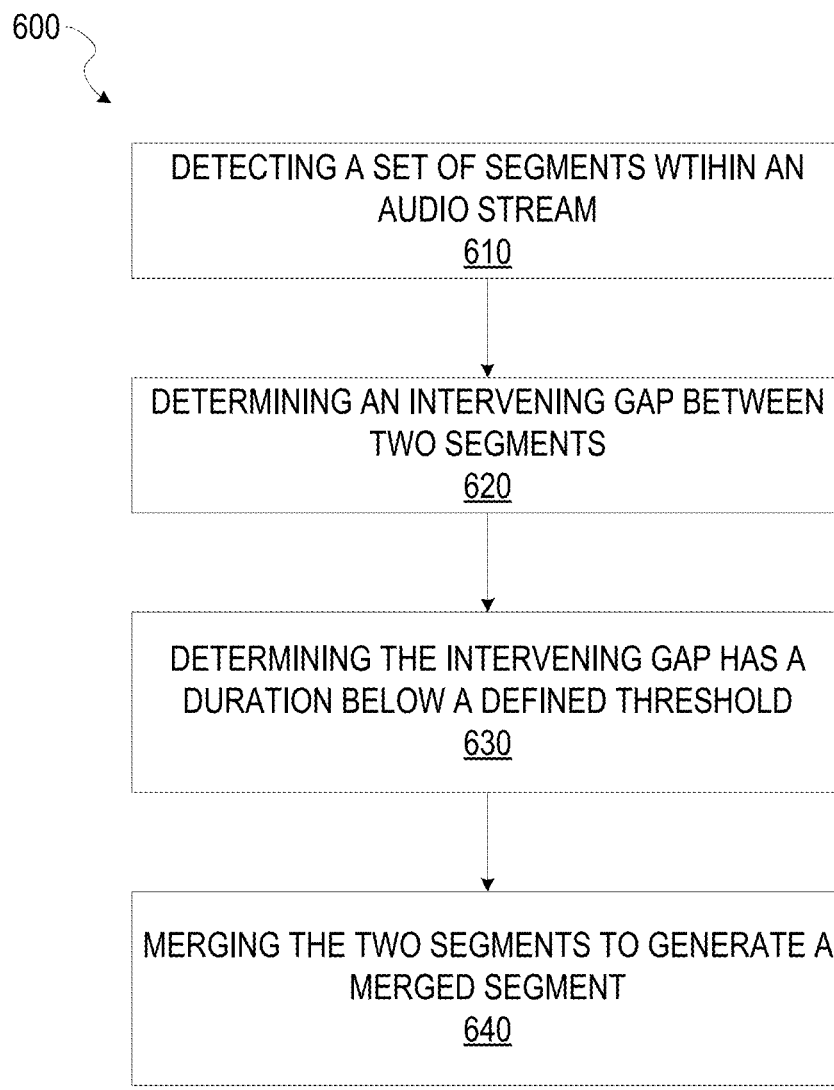
FIG. 6 is a flow diagram illustrating an example method for sound conversion, according to some example embodiments.

FIG. 6 depicts a flow diagram illustrating an example method 600 for converting audio data from one form to another, according to some example embodiments. The operations of method 600 may be performed by components of the sound conversion system 160. In some instances, certain operations of the method 600 may be performed using one or more operations of the method 300 or as sub-operations of one or more operations of the method 300, as will be explained in more detail below.

In operation 610, the conversion component 250 detects a set of segments within the audio stream. In some embodiments, each segment represents a portion of the audio stream in which audio data (e.g., voice data) is present. The segments may be understood as acoustic syllables (e.g., spoken or non-verbal sounds within the audio stream). In some embodiments, the set of segments are determined based on relative energy levels of speech or other audio data. As discussed in more detail below, high points in an energy level of the audio stream may indicate spoken or vocalized portions of the audio stream while low points in an energy level may indicate gaps between spoken or vocalized portions.

In operation 620, the conversion component 250 determines an intervening gap between two segments. In some instances, the intervening gap represents a portion of the audio stream in which voice data is absent. The intervening gap may be identified where an energy level in the audio stream falls below a specified threshold, a dynamic threshold (e.g., a relative threshold or an instance of a threshold designated for a period of time). The intervening gap may be determined where the energy level of the audio stream or a portion thereof (e.g., specified wavelengths, pitches, or tones) falls below the specified energy threshold for a period of time.

In operation 630, the conversion component 250 determines the intervening gap has a duration below a defined threshold (e.g., a gap threshold). For example, the gap threshold may be defined as a period of time during which the energy level of the audio stream is below the specified energy threshold. Where the intervening gap is of insufficient duration, the conversion component 250 may ignore the intervening gap. Such gaps may indicate a momentary break in speech, a stutter, an error in the audio stream, or other anomaly which is not representative of an intended break in an acoustic syllable. Where the intervening gap is of sufficient duration (e.g., exceeding the time associated with the gap threshold), the intervening gap may be designated as a dividing point between acoustic syllables or segments.

In operation 640, the conversion component 250 merges the two segments to generate a merged segment. The merged segment may be generated in response to the duration of the intervening gap being below the gap threshold. In some embodiments, the conversion component 250 may merge two or more segments in a manner similar to or the same as described above with respect to operation 430.

In some embodiments, the conversion component 250 generates merged segments having a duration sufficient to establish at least one pitch value for the merged segment. In some instances, where the merged segment is too short to identify, locate, interpret, or otherwise determine a pitch value for the merged segment, the conversion component 250 may merge additional segments with the merged segment until the sufficient duration is reached. The conversion component 250 may also determine whether the merged segment is voiced or unvoiced. Where the merged segment is unvoiced, the conversion component 250 may select and assign an interpolated pitch value for the merged segment.

Figure 7:
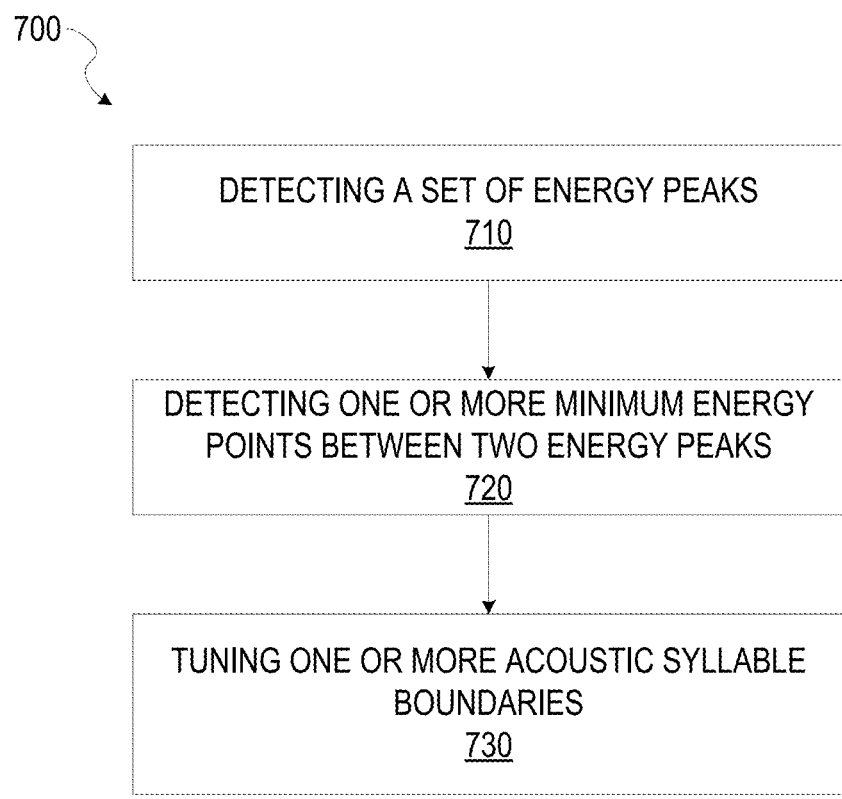
FIG. 7 is a flow diagram illustrating an example method for sound conversion, according to some example embodiments.

FIG. 7 depicts a flow diagram illustrating an example method 700 for converting audio data from one form to another, according to some example embodiments. The operations of method 700 may be performed by components of the sound conversion system 160. In some instances, certain operations of the method 700 may be performed using one or more operations of the methods 300 or 600 or as sub-operations of one or more operations of the methods 300 or 600, as will be explained in more detail below.

In operation 710, the conversion component 250 detects a set of energy peaks corresponding to, defining, or within a set of acoustic syllables. The conversion component 250 may detect the set of energy peaks using one or more energy analysis operations. In some instances, the energy analysis operations detect boundaries of syllables in spoken speech within the audio stream to be converted. In some embodiments, the syllable of concern to the conversion component 250 differ from linguistic syllables. The syllables of concern may be acoustic syllables. In some example embodiments, each detected syllable is regarded as a homogeneous acoustic unit whose prosody (pitch, stress, and duration) or homogeneous characteristics can be uniformly changed. In some instances, a speech recognition engine or a set of speech recognition operations may be employed to perform energy analysis operations or tasks of syllable detection.

In some instances, a computational cost of a speech recognition engine may be higher than a computational cost threshold. In such instances, the conversion component 250 performs the energy analysis operation in the manner described above. In some instances, the conversion component 250 identifies or uses syllables having at least one significant peak in energy. In some embodiments, the conversion component 250 discards or otherwise ignores one or more energy peaks having a value below a specified energy threshold.

In performing energy analysis operations, the conversion component 250 detects significant peaks in energy of the audio stream. Significant peaks may incorporate short-term and long-term smoothed frame energy. A short-term smoothed frame-energy, $\hat{E}_i^S$, may be calculated through summing and averaging frame energy within a window. A long-term smoothed frame-energy, $\overline{E}_i^L$, may be calculated in a manner similar to that of short-term smoothed frame energy. The value for "i" in the above representations may indicate a frame index. Through smoothing the energy contour, the conversion component 250 may remove or normalize false peaks. Similarly, smoothing the energy contour may aid in identifying insufficient peaks to be discarded or ignored.

In some embodiments, for each segment (e.g., voice segment) of the audio stream, energy peaks are obtained from the short-term smoothed frame-energy. For a $j^{th}$ peak, located at frame $P_i$, where "i" is the frame index, the conversion component 250 may define the difference energy as $E_j^D$. The energy difference may be expressed using Equation 1, below.

$$E_j^D = \hat{E}_{P_i}^S - \overline{E}_{P_i}^S \qquad \text{Equation 1}$$

The conversion component 250 may then calculate a normalized difference energy, represented by Equation 2, below.

$$\zeta_j = \frac{E_j^D - \mu_{E^D}}{\sigma^{E^D}} \qquad \text{Equation 2}$$

In Equation 2, $\mu_{E^D}$ and $\mu_{E^D}$ may be a mean and standard deviation of the $E_j^D$. In some embodiments, the conversion component 250 detects significant energy peaks (e.g., $\zeta_j > T_\zeta$) where $T_\zeta$ is a set threshold. In some instances, the $T_\zeta$ threshold may be empirically determined. The energy peaks may be retained as valid peaks where the energy peaks correspond, are estimated to correspond, or are assumed to correspond to syllables in the spoken speech of the audio stream.

In operation 720, the conversion component 250 detects one or more minimum energy points between two energy peaks of the set of energy peaks. In some embodiments, the one or more minimum energy points represent acoustic syllable boundaries. The conversion component 250 may identify boundaries between two adjacent syllables, located at a minimum energy between two energy peaks of syllables. In some instances, the minimum energy is a point at which an energy value falls below a specified energy threshold. After detecting peak energy points, the conversion component 250 may then detect one or more instances of minimal energy, such as a minimum energy point or energy valleys between two valid peaks. The found energy valleys may form or be identified as syllable boundaries.

In operation 730, the conversion component 250 tunes one or more acoustic syllable boundaries. In some embodiments, the one or more acoustic syllable boundaries correspond to the one or more minimum energy points. After detection of energy peaks and minimum energy points, the conversion component 250 may tune the detected syllable boundaries.

In some embodiments, the conversion component 250 identifies unvoiced stops, affricates, and fricatives located adjacent to the beginning and ending of a voiced segment. A new beginning of a voiced segment, $N_s$ may be updated based on the tuning, described in Operation Flow 1. For example, the conversion component 250 determines that $N_{left}$ denotes a number of frames to be searched to a left side of a start frame of a voiced segment. $T_{voiced}$ may denote an energy threshold, $\alpha_E$ may denote a set factor (e.g., an empirically set factor), and $\overline{E}$ may be an averaged frame energy in a current voiced segment. The conversion component 250 may expand a voiced segment at an end in a manner similar to the algorithm described above. In such instances, the search range of the operation flow may be from $N_{End}$ to $N_{Right}$.

---

Operation Flow 1

---

$T_{voiced} \leftarrow \alpha_E \times \overline{E}$
$k \leftarrow N_{Start}$
while $k > N_{Start} - N_{left}$ do
  if $E_k^S < T_{voiced}$ then
    break
  end
  $k \leftarrow k - 1$
end
$N_s \leftarrow k$

---

After Operation Flow 1, the conversion component 250 may obtain or generate a set of speech segments based on acoustic signals, based on pitch contours. Gaps between two segments may be interpreted as pauses or silence, where the gap extends longer than a specified period of time. Each segment may be further segmented into consecutive syllables. In some instances, each frame in the syllable may have a corresponding pitch value or interpolated pitch value identified by the conversion component 250. In some embodiments, the pitch values or interpolated pitch values may be identified based on whether a syllable is voiced or unvoiced.

Figure 8:
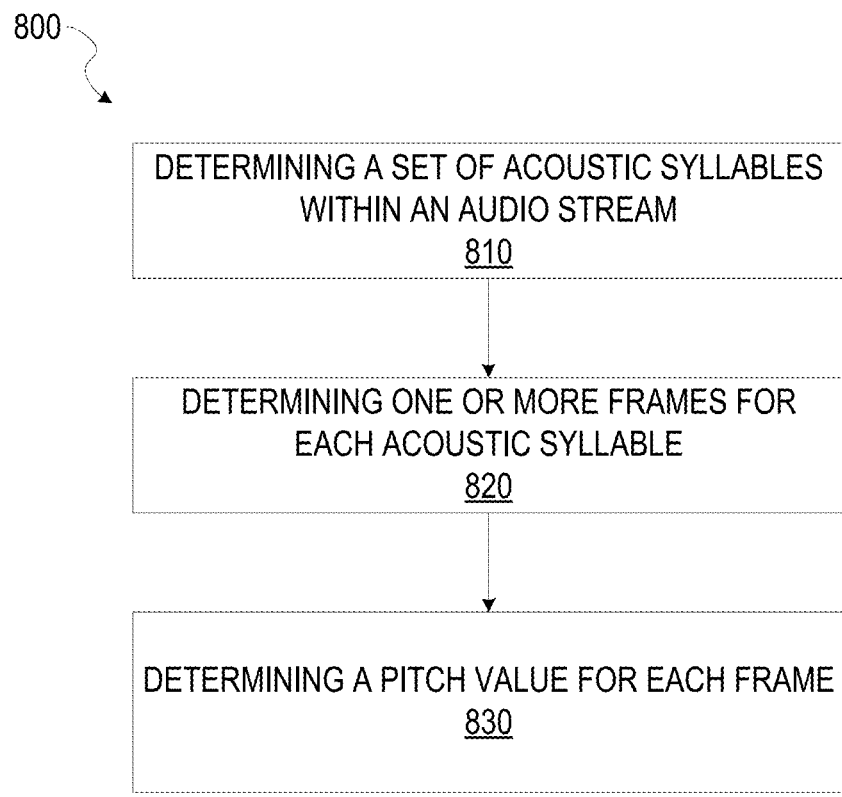
FIG. 8 is a flow diagram illustrating an example method for sound conversion, according to some example embodiments.

FIG. 8 depicts a flow diagram illustrating an example method 800 for converting audio data from one form to another, according to some example embodiments. The operations of method 800 may be performed by components of the sound conversion system 160. In some instances, certain operations of the method 800 may be performed using one or more operations of one or more of the methods 300, 600, or 700 or as sub-operations of one or more operations of one or more of the methods 300, 600, or 700, as will be explained in more detail below.

In operation 810, the conversion component 250 determines a set of acoustic syllables within the audio stream. The acoustic syllables may have a uniform duration and may be a uniform segment of voice data having one or more homogenous characteristics. As described above in FIGS. 3 and 7, in some embodiments, the conversion component 250 detects peak and minimum energy levels representing audio data for speech. The conversion component 250 may initially determine the set of acoustic syllables based on the peak energy levels, demarking each acoustic syllable as a segment of time within the audio stream existing between two minimum energy levels and including at least one peak energy level. In such instances, the conversion component 250 may determine a peak energy level within a given time in the audio stream. The conversion component 250 may identify two minimum energy levels proximate to the peak energy level, with one minimum energy level preceding the peak energy level and one minimum energy level following the peak energy level. The conversion component 250 may determine an acoustic syllable as a portion of the audio stream between the two minimum energy levels and corresponding to the peak energy level at a given time of the audio stream.

In operation 820, the conversion component 250 determines one or more frames. The frames may be determined for each acoustic syllable. The conversion component 250 may identify frames within the audio stream for conversion. For example, the conversion component 170 may segment the audio stream into N frames. In some instances, one or more frames of the N frames may overlap.

In operation 830, the conversion component 250 determines a pitch value for each frame. Upon frame segmentation, the conversion component 250 may perform one or more pitch estimation operations. In some embodiments, the pitch estimation operations extract spoken pitch contour from spoken speech. The pitch estimation operations may be performed for each frame within the one or more frames of the audio stream. First, in some example embodiments, pitch estimation is performed on spoken speech. The voiced segments in the spoken speech are indicated by the estimated pitch contour. Short pauses or unvoiced speech between voiced segments may occur within the audio stream and may be reflected in frames without pitch value.

The conversion component 250 may operate on spoken voiced segments which have an expected length or length within an expected range. For example, segments of the audio stream may include spoken voiced segments that are less than 1 second. Longer segments of speech, which can be mapped to sections of musical accompaniment, may be longer than spoken voiced segments. For example, the longer sung segments, of the model audio stream, may be several seconds in length. Two or more voiced segments may be merged, by the conversion component 250, if the gap in time between two or more voiced segments is less than a threshold pause value.

In some embodiments, determining a pitch value for each frame is performed using one or more sub-operations. The conversion component 250 may determine one or more unvoiced frames lacking a pitch value. For the frames in the merged voiced segments that are not voiced, pitch interpolation may be performed so that each frame in the voiced segment has a pitch value. In some instances, the conversion component 250 generates an interpolated pitch value for the one or more unvoiced frames. The interpolated pitch value may be inferred or carried over from one or more adjacent or proximate frames. In instances where a discernable word is not spoken in a frame but other vocalizations are performed (e.g., humming, whistling, vocal interjection, etc.), the frame may be considered unvoiced. However, in unvoiced frames with vocalizations, the conversion component 250 may determine a pitch value for the vocalization.

Figure 9:
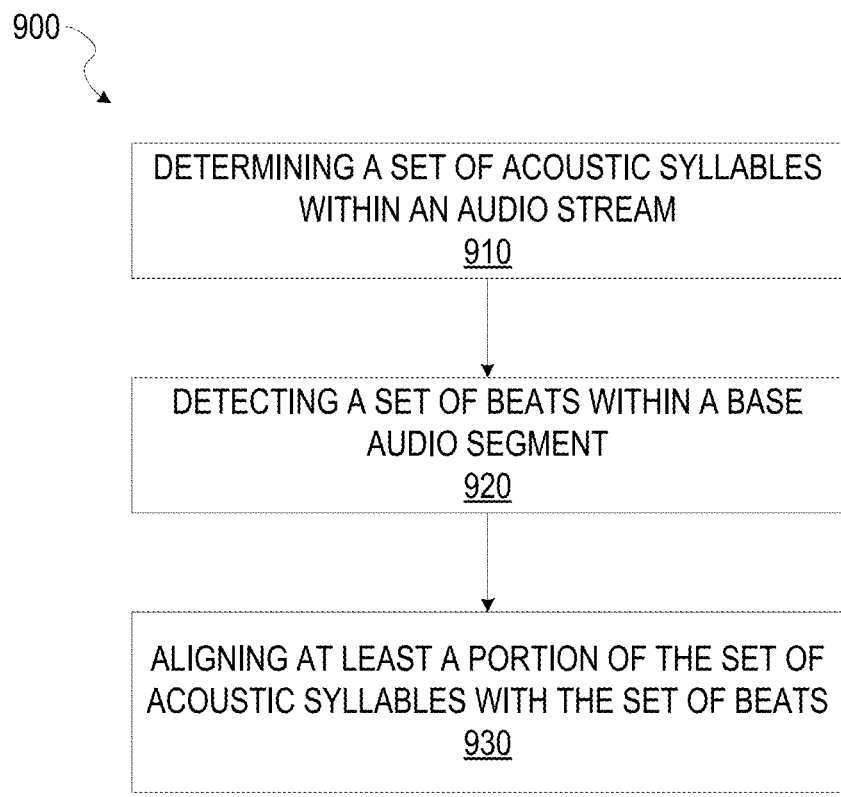
FIG. 9 is a flow diagram illustrating an example method for sound conversion, according to some example embodiments.

FIG. 9 depicts a flow diagram illustrating an example method 900 for converting audio data from one form to another, according to some example embodiments. The operations of method 900 may be performed by components of the sound conversion system 160. In some instances, certain operations of the method 900 may be performed using one or more operations of one or more of the methods 300, 600, 700, or 800 or as sub-operations of one or more operations of one or more of the methods 300, 600, 700, or 800, as will be explained in more detail below.

In operation 910, the conversion component 250 determines a set of acoustic syllables within the audio stream. The acoustic syllables may have a uniform duration and may be a uniform segment of voice data having one or more homogenous characteristics. In some embodiments, the acoustic syllables are determined in a manner similar to or the same as described above with respect to methods 600, 700, and 800.

Figure 10:
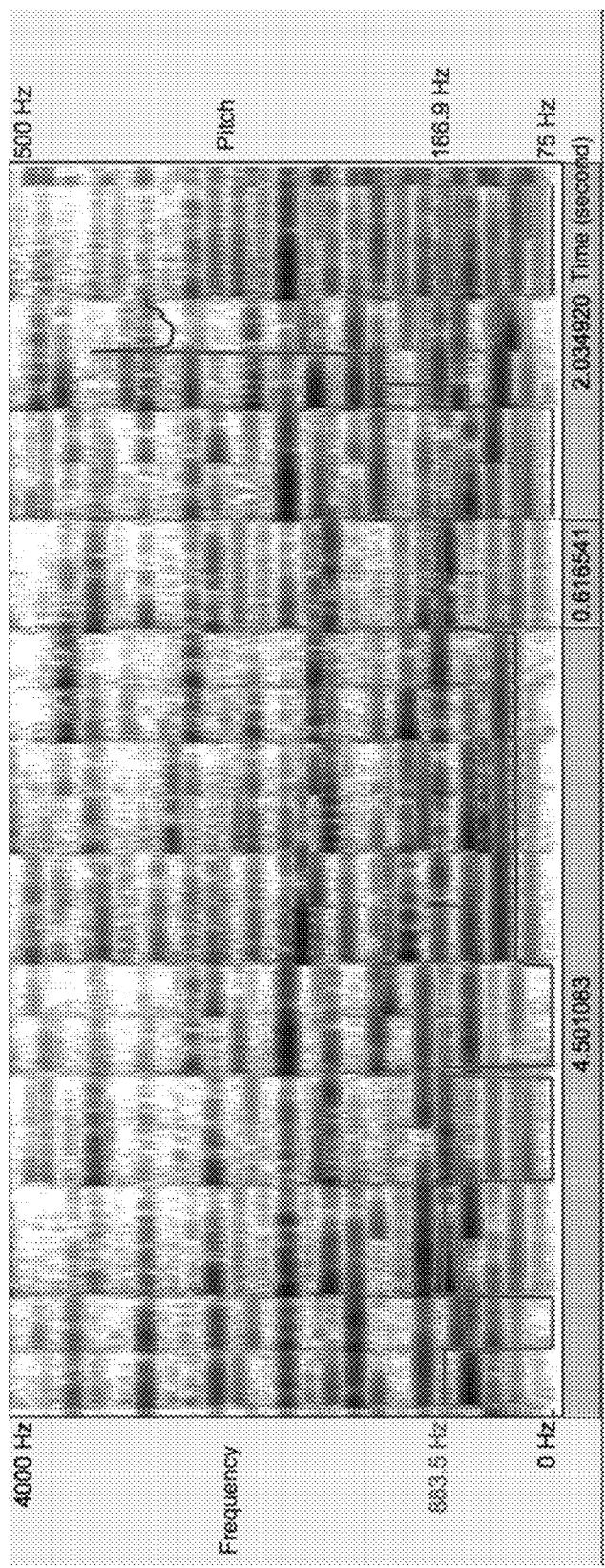
FIG. 10 is a graphical representation of aspects of an audio stream, according to some example embodiments.

In operation 920, the conversion component 250 detects a set of beats within a base audio segment. In some embodiments, the conversion component 250 detects the set of beats using one or more operations for beat analysis. In some instances, music accompaniment is played by a single acoustic instrument. Some example embodiments employ music accompaniment employs multiple instruments. The conversion component 250 may detect a duration of notes from the accompaniment if musical scores are unavailable. As shown in FIG. 10, beat starting at second 4.50 with a duration of 0.61 seconds may be detected. The conversion component 250 may determine that spectral energy fluctuates near boundary areas of beats. The conversion component 170 may use Itakura and Saito distances for beat detection.

In some instances of beat detection, the conversion component 250 performs one or more operations on a framed acoustic signal of an accompaniment. The one or more operations may include a $N_{FFT}$-point DFT. As depicted in Equation 3, below, $S_i[j]$ may denote a $j^{th}$ FFT bin of the $i^{th}$ frame. A beat distance, such as the Itakura and Saito distance, may be calculated. The beat distance may be represented by Di and calculated according to Equation 3.

$$D_i = \frac{2}{N_{FFT}/2} \sum_{j=1}^{N_{FFT}/2} \left[ \frac{S_i[j]}{S_{i-1}[j]} - \log\frac{S_i[j]}{S_{i-1}[j]} - 1 \right] \quad \text{Equation 3}$$

A smoothed version of $D_i$, such as $\overline{D}_i$, is calculated through summing and averaging $D_i$ within a window. Such smoothing may remove false positive peaks. In some instances, the frame index of a local peak in a smoothed distance may be considered as a beat boundary. For example, a beat boundary may be determined if $\overline{D}_i > T_{Itakura\text{-}Saito}$. After the conversion component 250 identifies a sequence or set of beats, $B_k$, the energy of each beat may be estimated and denoted accordingly In operation 930, the conversion component 250 aligns at least a portion of the set of acoustic syllables with the set of beats. The conversion component 170 may receive, identify, or determine a sequence of notes. The sequence of notes may be detected in the accompaniment. The sequence of notes may correspond to the beats detected in operation 910. In some embodiments, the accompaniment may operate as a base audio segment. The conversion component 250 may detect a sequence of syllables from the audio stream (e.g., syllables detected, as described above, from the spoken voice of the audio stream). In some instances, the conversion component 250 aligns a syllable to one or more beats. Alignment with multiple beats may occur where sung syllables are slow, in terms of words per minute, than spoken syllables. In some embodiments, operations 920 and 930 may be performed as part of compiling the audio construct (e.g., operation 340).

In aligning the beats and syllables, the conversion component 250 may detect a speech segment starting at a given frame or set of frames, such as a set of frames starting at frame $N_s$ and ending at frame $N_e$. The speech segment may be detected in spoken voice included in the audio stream with M syllables. The conversion component 250 may identify that the $m^{th}$ syllable starts at frame $N_s^m$ and ends at frame $N_e^m$. The conversion component 250 may identify an alignment of syllables to beats defined by the audio conversion model. In some instances, the audio conversion model may have syllables and beats aligned from sung lyrics used to generate the template pitch contour or audio conversion model. In some embodiments, the conversion component 250 detects boundaries of notes in the accompaniment (e.g., the base audio segment). The detected boundaries may be used to further segment each of the $p^{th}$ pith segments into $L^p$ notes. The $l^{th}$ note may range from frame $N_s^p[l]$ too frame $N_e^p[l]$. Operation Flow 2, shown below, may be used by the conversion component 250 to determine the alignment described above.

---

Operation Flow 2

```
p ← 1
m ← 1
while p <= P do
|   l ← 1
|   while l <L^p and m < M do
|   |   align syllable [ N_s[m], N_e[m] ] to pitch
|   |       segment [ N_s^p[l], N_e^p[l] ]
|   |   m ← m + 1
|   |   l ← l + 1
|   end
|   if m == M then
|   |   align syllable [ N_s[m], N_e[m] ] to pitch
|   |       segment [ N_s^p[l], N_e^p[L^p] ]
|   |   break
|   else
|   |   align syllable [ N_s[m], N_e[m] ] to pitch
|   |       segment [ N_s^p[L^p], N_e^p[L^p] ]
|   |   m ← m + 1
|   p ← p + 1
end
```

---

In Operation Flow 2, "P" may be a number of pitch segments remaining to be aligned, "p" may be an index of a current pitch segment, "M" may be a number of syllables in the current speech segment $[N_s, N_e]$, and "m" may be a current index of syllables to be aligned. In Operation Flow 2, "$N_s[m]$, $N_e[m]$" may be starting and ending frames of the $m^{th}$ syllable, "$L^p$" may be a number of notes in the $p^{th}$ pitch segment, "l" may be a current index of notes to be aligned, and "$N_s^p[l]$, $N_e^p[l]$" may be starting and ending frames of the $l^{th}$ note in the $p^{th}$ pitch segment.

In some instances, the conversion component 250 selects a length of music accompaniment (e.g., the base audio segment) to be long enough, compared to the length of spoken voice, such that each syllable in the audio stream including the spoken voice may be aligned to at least one note in a pitch segment. Each speech segment may thereby be aligned to one or more pitch segments. Each syllable, within each speech segment, may be aligned to one pitch segment, and a last syllable may be aligned to one note or all of the rest of the notes in the current pitch segment.

Embodiments of the present disclosure provide increased accuracy and efficiency in detecting speech segments than previous systems or methods. The embodiments of the present disclosure enable conversion of speech to sung audio. Such audio conversion includes increased efficiency, accuracy, and quality in converting audio data from one type of vocalization to another. Further, the audio conversion provides a truer conversion, avoiding mechanistic or artificial sounds being added to the converted audio stream.

Modules, Components, and Logic

Certain embodiments are described herein as including logic or a number of components, modules, or mechanisms. Modules and components can constitute either software modules or components (e.g., code embodied on a machine-readable medium or in a transmission signal) or hardware modules or components. A "hardware component" is a tangible unit capable of performing certain operations and can be configured or arranged in a certain physical manner. In various example embodiments, one or more computer systems (e.g., a standalone computer system, a client computer system, or a server computer system) or one or more hardware components of a computer system (e.g., a processor or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented components that operate to perform one or more operations or functions described herein. As used herein, "processor-implemented component" refers to a hardware component implemented using one or more processors.

Similarly, the methods described herein can be at least partially processor-implemented, with a particular processor or processors being an example of hardware. For example, at least some of the operations of a method can be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 11:
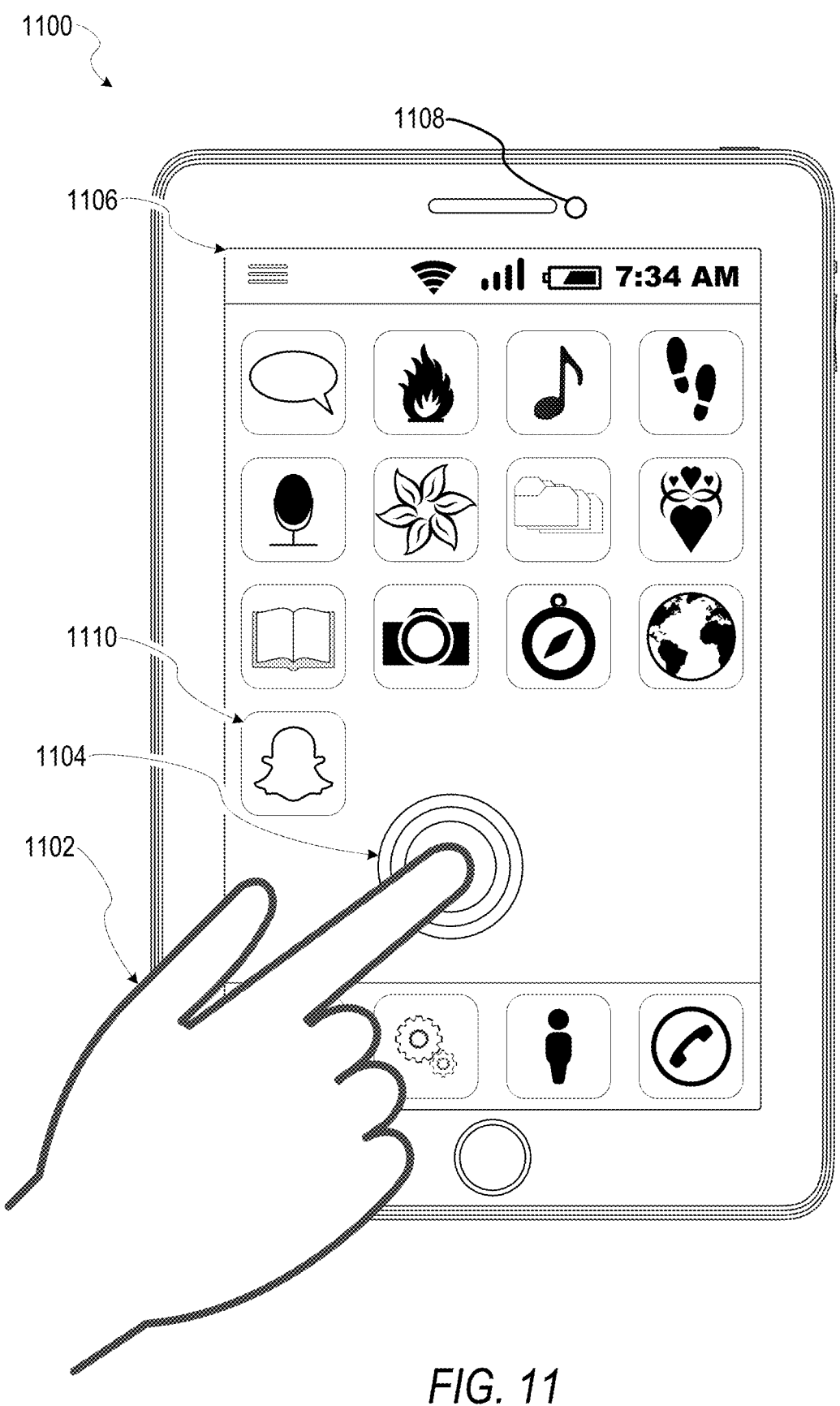
FIG. 11 is a user interface diagram depicting an example mobile device and mobile operating system interface, according to some example embodiments.

FIG. 11 illustrates an example mobile device 1100 executing a mobile operating system (e.g., IOS™, ANDROID™, WINDOWS® Phone, or other mobile operating systems), consistent with some embodiments. In one embodiment, the mobile device 1100 includes a touch screen operable to receive tactile data from a user 1102. For instance, the user 1102 may physically touch 1104 the mobile device 1100, and in response to the touch 1104, the mobile device 1100 may determine tactile data such as touch location, touch force, or gesture motion. In various example embodiments, the mobile device 1100 displays a home screen 1106 (e.g., Springboard on IOS™) operable to launch applications or otherwise manage various aspects of the mobile device 1100. In some example embodiments, the home screen 1106 provides status information such as battery life, connectivity, or other hardware statuses. The user 1102 can activate user interface elements by touching an area occupied by a respective user interface element. In this manner, the user 1102 interacts with the applications of the mobile device 1100. For example, touching the area occupied by a particular icon included in the home screen 1106 causes launching of an application corresponding to the particular icon. The mobile device 1100, as shown in FIG. 11, includes an imaging device 1108. The imaging device 1108 may be a camera or any other device coupled to the mobile device 1100 capable of capturing a video stream or one or more successive images.

Many varieties of applications (also referred to as "apps") can be executing on the mobile device 1100, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1100 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1100 includes a social messaging app 1110, consistent with some embodiments, allows users to exchange ephemeral messages that include media content. In this example, the social messaging app 1110 can incorporate aspects of embodiments described herein.

Software Architecture

Figure 12:
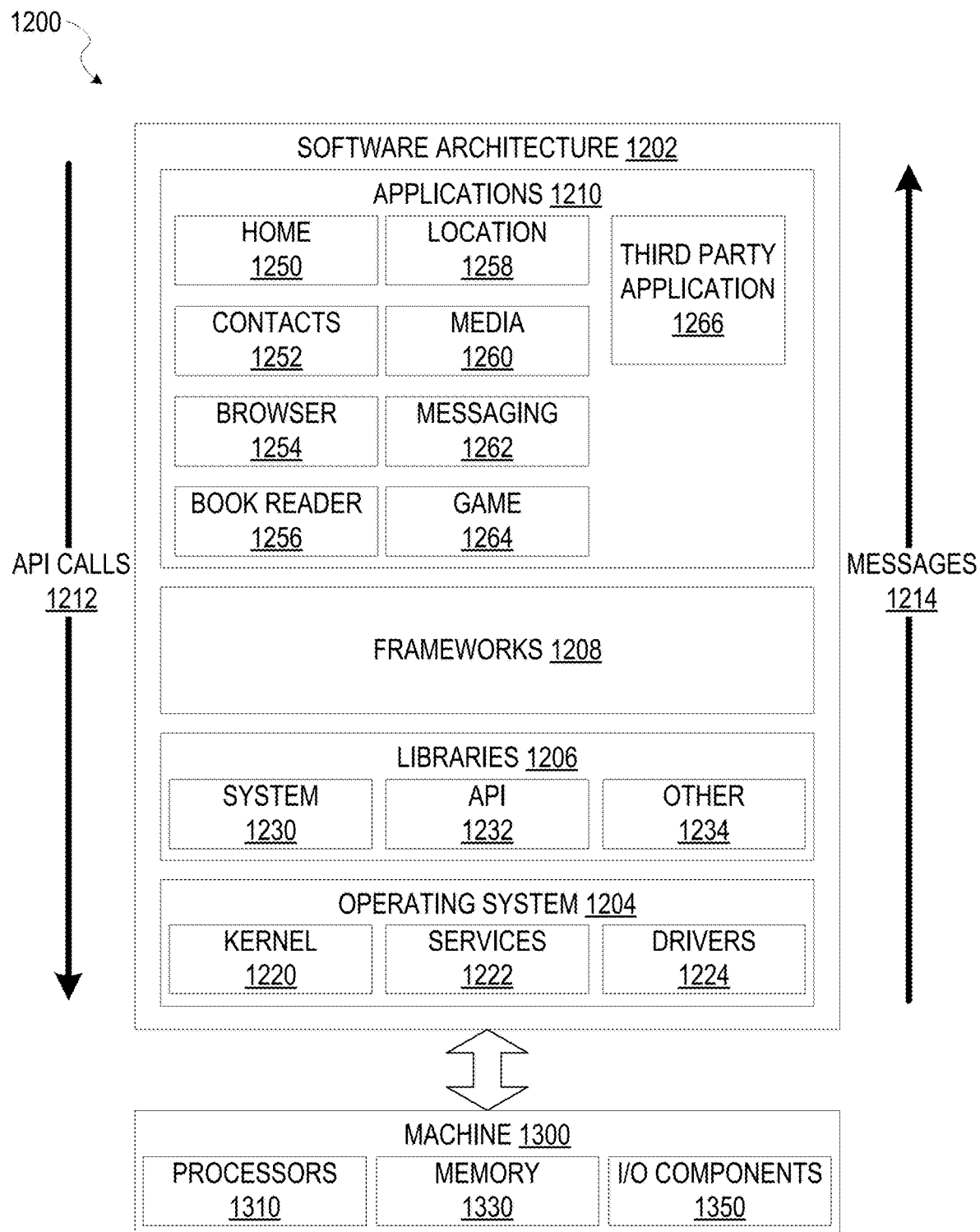
FIG. 12 is a block diagram illustrating an example of a software architecture that may be installed on a machine, according to some example embodiments.

FIG. 12 is a block diagram 1200 illustrating an architecture of software 1202, which can be installed on any one or more of the devices described above. FIG. 12 is merely a non-limiting example of a software architecture, and it will be appreciated that many other architectures can be implemented to facilitate the functionality described herein. In various embodiments, the software 1202 is implemented by hardware such as machine a 1300 of FIG. 13 that includes processors 1310, memory 1330, and I/O components 1350. In this example architecture, the software 1202 can be conceptualized as a stack of layers where each layer may provide a particular functionality. For example, the software 1202 includes layers such as an operating system 1204, libraries 1206, frameworks 1208, and applications 1210.

Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third party application 1266. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1266 can invoke the API calls 1212 provided by the operating system 1204 to facilitate functionality described herein.

Example Machine Architecture and Machine-Readable Medium

Figure 13:
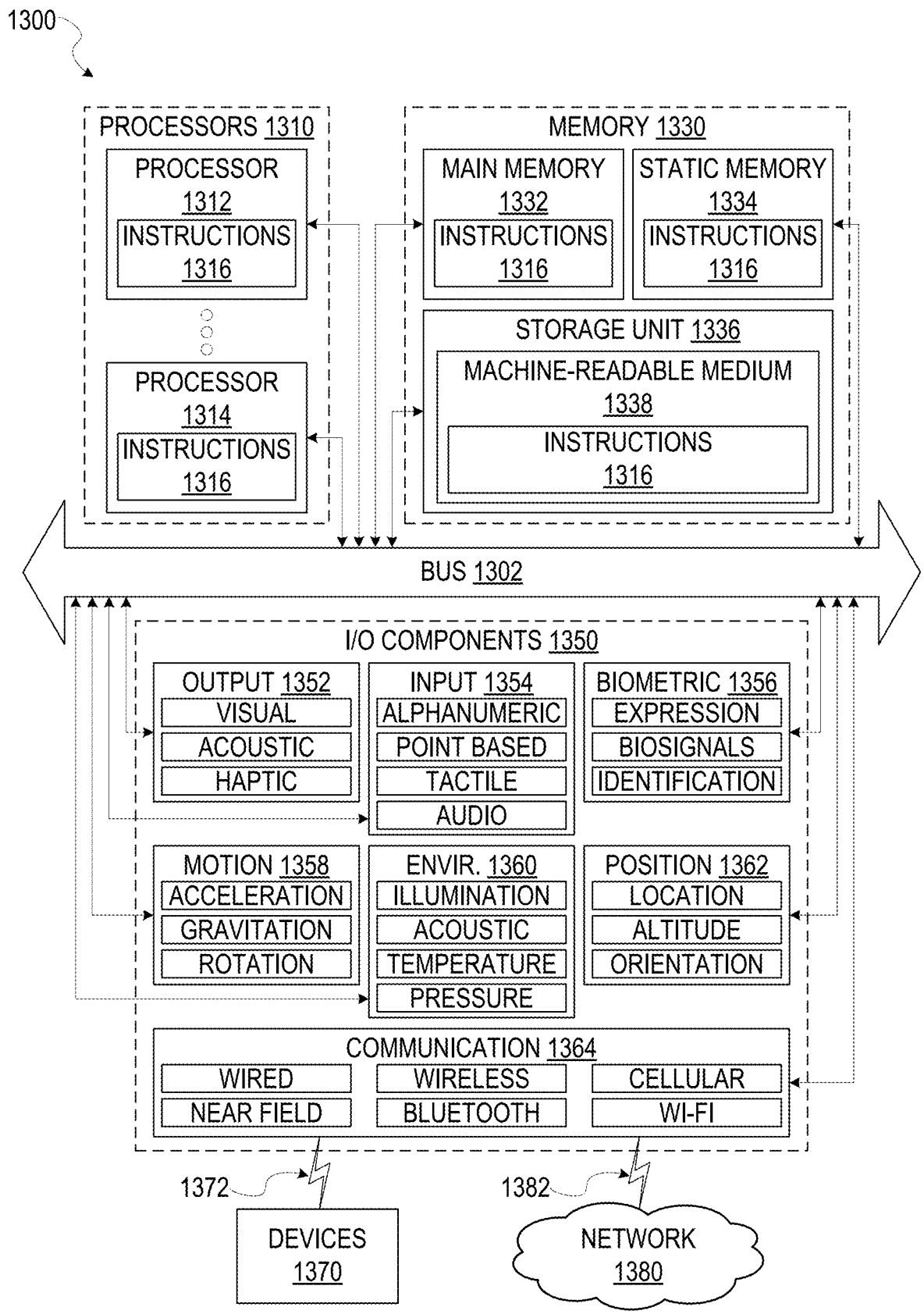
FIG. 13 is a block diagram presenting a diagrammatic representation of a machine in the form of a computer system within which a set of instructions may be executed for causing the machine to perform any one or more of the methodologies discussed herein, according to an example embodiment.

FIG. 13 is a block diagram illustrating components of a machine 1300, according to some embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein can be executed. In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1312 and a processor 1314 that may execute the instructions 1316. The term "processor" is intended to include multi-core processors that may comprise two or more independent processors (also referred to as "cores") that can execute instructions contemporaneously. Although FIG. 13 shows multiple processors, the machine 1300 may include a single processor with a single core, a single processor with multiple cores (e.g., a multi-core processor), multiple processors with a single core, multiple processors with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any one or more of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 or processor-readable storage medium able to store data temporarily or permanently and may be taken to include, but not be limited to, random-access memory (RAM), read-only memory (ROM), buffer memory, flash memory, and cache memory. While the machine-readable medium 1338 is shown in an example embodiment to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se and may be understood as non-transitory.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1370 may be another machine or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium should be considered as being transportable from one physical location to another. Additionally, since the machine-readable medium 1338 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is provisionally claimed is:

1. A method, comprising:
receiving an audio conversion request configured to initiate conversion of one or more sound characteristics of an audio stream from a first state to a second state, the first state comprising spoken words and the second state comprising sung lyrics;
generating, using an audio signature for the second state, an audio conversion model based on an image of a musical score;

converting the audio stream based on the audio conversion model that is generated based on the image or text of the musical score, the converting comprising:
determining that a first segment comprising acoustic syllables of the spoken words in audio stream is of an insufficient duration to determine a pitch value for the segment;
in response to determining that the segment is of the insufficient duration to determine the pitch value for the segment, merging a set of additional segments comprising acoustic syllables of the spoken words with the first segment to form a merged segment that is of a sufficient duration to determine the pitch value of the merged segment;
compiling an audio construct from the converted audio stream and a base audio segment, the compiling comprising aligning a first syllable of the acoustic syllables to a plurality of beats; and
causing presentation of the compiled audio construct at a client device.

2. The method of claim 1, further comprising:
detecting a set of segments within the audio stream, each segment representing a portion of the audio stream in which voice data is present;
determining an intervening gap between two segments of the set of segments, the intervening gap representing a portion of the audio stream in which voice data is absent;
determining the intervening gap has a duration below a defined threshold;
merging the two segments to generate another merged segment in response to the duration of the intervening gap being below the defined threshold; and
assigning an interpolated pitch value of the merged segment.

3. The method of claim 1, wherein the musical score comprises sheet music with a progression of notes, further comprising:
determining a set of acoustic syllables within the audio stream, the acoustic syllables being a uniform segment of voice data having one or more homogeneous characteristics.

4. The method of claim 3, further comprising:
detecting a set of energy peaks within the set of acoustic syllables; and
detecting one or more minimum energy points between two energy peaks of the set of energy peaks, the one or more minimum energy point representing acoustic syllable boundaries.

5. The method of claim 4, wherein detecting a set of energy peaks further comprises:
discarding one or more energy peaks having a value below a specified energy threshold.

6. The method of claim 4, further comprising:
tuning one or more acoustic syllable boundaries corresponding to the one or more minimum energy points.

7. The method of claim 6, further comprising:
for each acoustic syllable, determining one or more frames; and
for each frame, determining a pitch value.

8. The method of claim 7, wherein determining a pitch value for each frame further comprises:
determining one or more unvoiced frames lacking a pitch value; and
generating an interpolated pitch value for the one or more unvoiced frames.

9. The method of claim 1, wherein compiling the audio construct further comprises:
detecting a set of beats within a base audio segment; and
aligning at least a portion of the acoustic syllables with the set of beats.

10. A system, comprising:
one or more processors; and
a machine-readable non-transitory processor-readable storage medium storing processor-executable instructions that, when executed by the one or more processors, cause the one or more processors to perform operations comprising:
receiving an audio conversion request configured to initiate conversion of one or more sound characteristics of an audio stream from a first state to a second state, the first state comprising spoken words and the second state comprising sung lyrics;
generating, using an audio signature for the second state, an audio conversion model based on an image of a musical score;
converting the audio stream based on the audio conversion model that is generated based on the image or text of the musical score, the converting comprising:
determining that a first segment comprising acoustic syllables of the spoken words in audio stream is of an insufficient duration to determine a pitch value for the segment;
in response to determining that the segment is of the insufficient duration to determine the pitch value for the segment, merging a set of additional segments comprising acoustic syllables of the spoken words with the first segment to form a merged segment that is of a sufficient duration to determine the pitch value of the merged segment;
compiling an audio construct from the converted audio stream and a base audio segment, the compiling comprising aligning a first syllable of the acoustic syllables to a plurality of beats; and
causing presentation of the compiled audio construct at a client device.

11. The system of claim 10, wherein the operations further comprise:
detecting a set of segments within the audio stream, each segment representing a portion of the audio stream in which voice data is present;
determining an intervening gap between two segments of the set of segments, the intervening gap representing a portion of the audio stream in which voice data is absent;
determining the intervening gap has a duration below a defined threshold;
merging the two segments to generate another merged segment in response to the duration of the intervening gap being below the defined threshold; and
assigning an interpolated pitch value of the merged segment.

12. The system of claim 10, wherein the musical score comprises sheet music with a progression of notes, and wherein the operations further comprise:
determining a set of acoustic syllables within the audio stream, the acoustic syllables being a uniform segment of voice data having one or more homogeneous characteristics.

13. The system of claim 12, wherein the operations further comprise:
detecting a set of energy peaks within the set of acoustic syllables; and detecting one or more minimum energy points between two energy peaks of the set of energy peaks, the one or more minimum energy point representing acoustic syllable boundaries.

14. The system of claim 13, wherein the operations further comprise:
tuning one or more acoustic syllable boundaries corresponding to the one or more minimum energy points.

15. The system of claim 14, wherein the operations further comprise:
for each acoustic syllable, determining one or more frames; and
for each frame, determining a pitch value.

16. The system of claim 15, wherein determining a pitch value for each frame further comprises:
determining one or more unvoiced frames lacking a pitch value; and
generating an interpolated pitch value for the one or more unvoiced frames.

17. The system of claim 10, wherein compiling the audio construct further comprises:
detecting a set of beats within a base audio segment; and
aligning at least a portion of the acoustic syllables with the set of beats, wherein a first syllable of the acoustic syllables is aligned to a plurality of beats of the set of beats.

18. A non-transitory processor-readable storage medium storing processor executable instructions that, when executed by a processor of a machine, cause the machine to perform operations comprising:
receiving an audio conversion request configured to initiate conversion of one or more sound characteristics of an audio stream from a first state to a second state, the first state comprising spoken words and the second state comprising sung lyrics;
generating, using an audio signature for the second state, an audio conversion model based on an image of a musical score;
converting the audio stream based on the audio conversion model that is generated based on the image or text of the musical score, the converting comprising:
determining that a first segment comprising acoustic syllables of the spoken words in audio stream is of an insufficient duration to determine a pitch value for the segment;
in response to determining that the segment is of the insufficient duration to determine the pitch value for the segment, merging a set of additional segments comprising acoustic syllables of the spoken words with the first segment to form a merged segment that is of a sufficient duration to determine the pitch value of the merged segment;
compiling an audio construct from the converted audio stream and a base audio segment, the compiling comprising aligning a first syllable of the acoustic syllables to a plurality of beats; and
causing presentation of the compiled audio construct at a client device.

19. The non-transitory processor-readable storage medium of claim 18, wherein the operations further comprise:
detecting a set of segments within the audio stream, each segment representing a portion of the audio stream in which voice data is present;
determining an intervening gap between two segments of the set of segments, the intervening gap representing a portion of the audio stream in which voice data is absent;
determining the intervening gap has a duration below a defined threshold;
merging the two segments to generate another merged segment in response to the duration of the intervening gap being below the defined threshold; and
assigning an interpolated pitch value of the merged segment.

20. The non-transitory processor-readable storage medium of claim 18, wherein the operations further comprise:
detecting a set of energy peaks within a set of acoustic syllables;
detecting one or more minimum energy points between two energy peaks of the set of energy peaks, the one or more minimum energy point representing acoustic syllable boundaries;
tuning one or more acoustic syllable boundaries corresponding to the one or more minimum energy points;
for each acoustic syllable, determining one or more frames; and
for each frame, determining a pitch value.

* * * * *